(12) United States Patent
Yamasaki

(10) Patent No.: US 8,471,418 B2
(45) Date of Patent: Jun. 25, 2013

(54) MOTORIZED EQUIPMENT

(75) Inventor: Masashi Yamasaki, Obu (JP)

(73) Assignee: Denso Corporation, Kariya (JP)

( * ) Notice: Subject to any disclaimer, the term of this patent is extended or adjusted under 35 U.S.C. 154(b) by 263 days.

(21) Appl. No.: 13/087,683

(22) Filed: Apr. 15, 2011

(65) Prior Publication Data

US 2011/0254388 A1 Oct. 20, 2011

(30) Foreign Application Priority Data

Apr. 16, 2010 (JP) .................................. 2010-94788

(51) Int. Cl.
*H02K 11/00* (2006.01)

(52) U.S. Cl.
USPC .......................................... 310/68 R; 310/71

(58) Field of Classification Search
USPC .......................................... 310/68 R, 68 D, 71
See application file for complete search history.

(56) References Cited

U.S. PATENT DOCUMENTS

| | | | | |
|---|---|---|---|---|
| 4,840,222 | A * | 6/1989 | Lakin et al. ....................... | 165/47 |
| 5,619,108 | A * | 4/1997 | Komurasaki et al. ......... | 318/140 |
| 5,632,351 | A | 5/1997 | Ishiyama | |
| 7,414,339 | B2 | 8/2008 | Kitamura et al. | |
| 7,479,718 | B2 | 1/2009 | Kikuchi et al. | |
| 7,928,725 | B2 | 4/2011 | Takahashi | |
| 2003/0015928 | A1* | 1/2003 | Asao ........................... | 310/68 D |
| 2003/0127921 | A1 | 7/2003 | Akutsu et al. | |
| 2004/0124726 | A1* | 7/2004 | Hans ............................. | 310/71 |
| 2005/0121986 | A1* | 6/2005 | Matsuki ........................ | 310/64 |
| 2006/0087181 | A1* | 4/2006 | Kusumi ...................... | 310/68 D |
| 2006/0152095 | A1* | 7/2006 | Kikuchi et al. ............. | 310/68 R |
| 2006/0158049 | A1* | 7/2006 | Suzuki et al. .................. | 310/52 |
| 2006/0181162 | A1* | 8/2006 | Pierret et al. ................. | 310/58 |
| 2006/0202573 | A1* | 9/2006 | Uehara et al. .................. | 310/64 |
| 2007/0035270 | A1 | 2/2007 | Kitamura et al. | |
| 2010/0288577 | A1 | 11/2010 | Sonoda et al. | |

FOREIGN PATENT DOCUMENTS

| | | |
|---|---|---|
| CN | 201064017 | 5/2008 |
| JP | A-9-084302 | 3/1997 |
| JP | A-10-234158 | 9/1998 |
| JP | 2002-345211 | 11/2002 |

(Continued)

OTHER PUBLICATIONS

Japanese Office Action dated May 8, 2012, issued in corresponding Japanese Application No. 2010-094788 with English translation.

(Continued)

*Primary Examiner* — Thanh Lam

(74) *Attorney, Agent, or Firm* — Nixon & Vanderhye PC

(57) ABSTRACT

A power module, a control board and a heat sink are provided on one axial side of a shaft of an electric motor, which consists of a motor case, a stator, a rotor, the shaft and the like. The power module is electrically connected with extraction lines, which extend from a coil wound around the stator, and supplies a drive current to the coil. The control board for controlling switching of the power module is provided on a motor case side of the power module. The heat sink is provided on a side of the control board opposite to the motor case. Thus, when setting of an output of the electric motor is changed, a body size of the heat sink can be changed without changing a positional relationship between the control board and the electric motor and a positional relationship between the power module and the electric motor.

9 Claims, 21 Drawing Sheets

FOREIGN PATENT DOCUMENTS

| | | |
|---|---|---|
| JP | P2008-187798 A | 8/2008 |
| JP | P2009-100642 A | 5/2009 |
| JP | P2010-028925 A | 2/2010 |

OTHER PUBLICATIONS

Matsuda et al, U.S. Appl. No. 13/087,670, filed Apr. 15, 2011.
Minato, U.S. Appl. No. 13/087,658, filed Apr. 15, 2011.
Office Action (1 page) dated Jan. 11, 2013, issued in corresponding Japanese Application No. 2010-094788 and English translation (2 pages).
Office Action (9 pages) dated Jan. 10, 2013 issued in corresponding Chinese Application No. 201110097744.6 and English translation (13 pages).

\* cited by examiner

MOTORIZED EQUIPMENT

CROSS REFERENCE TO RELATED APPLICATION

This application is based on and incorporates herein by reference Japanese Patent Application No. 2010-94788 filed on Apr. 16, 2010.

BACKGROUND OF THE INVENTION

1. Field of the Invention

The present invention relates to a motorized equipment having a controller provided on one axial side of a shaft of an electric motor.

2. Description of Related Art

Conventionally, electric power steering for assisting steering, which is performed by a driver, has been publicly known. Reduction of a size and weight and enhancement of an output of a motor used for the electric power steering are required.

A motor described in Patent document 1 (JP-A-2003-204654) has a controller, which drives and controls an electric motor, provided parallel to an axial direction of a shaft of the electric motor. The electric motor is composed of a motor case, a stator, a rotor, the shaft and the like (refer to FIGS. 14 and 15 of Patent document 1). The controller is composed of a heat sink, a metallic substrate, a control board and the like. The heat sink is fixed to a radially outer wall of the motor case of the electric motor. The metallic substrate mounted with a power transistor is fixed to the heat sink. The control board is attached to an opposite side of the heat sink at a predetermined distance from the metallic substrate.

As for connection of wirings of the electric motor and the controller, lead wires electrically connected with a coil, which is wound around the stator, extend in a direction perpendicular to the axis of the shaft and are connected with wirings of the metallic substrate. Lead wires extending from a position sensor, which can sense a rotation angle of the rotor, extend in a direction perpendicular to the axis of the shaft and are connected with wirings of the control board.

A motor described in Patent document 2 (JP-A-2002-345211) has a controller provided on an axial end side of a shaft of an electric motor (refer to FIGS. 1 to 3 of Patent document 2). A heat sink constituting the controller is attached to block an opening of a cylindrical motor case of the electric motor. A metallic substrate mounted with a power transistor is attached to the heat sink. A control board is attached to an opposite side of the heat sink at a predetermined distance from the metallic substrate.

As for connection between wirings of the electric motor and the controller, winding terminals extending from a coil, which is wound around a stator, extend parallel to an axis of a shaft and are connected with electric motor terminals extending from the metallic substrate. Sensor terminals connected to a position sensor, which can sense a rotation angle of the rotor, extend through a magnetic sensor holding section, which is made of a resin, and are connected with wirings of the control board.

An output of the electric motor of the motor used for the electric power steering is set differently according to weight and the like of a type of vehicle, to which the motor is applied. If an amount of heat generation of the power transistor changes according to the setting of the output of the electric motor, a necessary heat capacity of the heat sink changes. Therefore, a volume of the heat sink is changed.

If the setting of the output of the electric motor changes in the construction of the motor described in Patent document 1, a distance between a radially outer wall of the motor case and the metallic substrate and a distance between the radially outer wall of the motor case and the control board change with the change in the volume of the heat sink. Therefore, designs of the lead wires electrically connected with the coil, the lead wires extending from the position sensor and the like are changed.

If the setting of the output of the electric motor changes in the construction of the motor described in Patent document 2, a distance between the opening of the motor case and the metallic substrate and a distance between the opening of the motor case and the control board change with the change in the volume of the heat sink. Therefore, designs of the winding terminals extending from the coil, the electric motor terminals extending from the metallic substrate, the sensor terminals connected to the position sensor, the magnetic sensor holding section and the like are changed. In this way, if the designs of the members constituting the controller and the like are changed according to the setting of the output of the electric motor, there is a concern that a manufacturing cost of the motor increases.

Since the motor described in Patent document 1 has the controller arranged parallel to the axial direction of the shaft of the electric motor, there is a concern that a body size in a radial direction increases.

The motor described in Patent document 2 requires a space for performing a connecting process of the electric motor terminals, which extend from the metallic substrate, and the winding terminals, which extend from the coil, between the metallic substrate and the control board. In addition, the motor requires a space for performing a connecting process of the sensor terminals of the position sensor and the control board between the metallic substrate and the control board. Therefore, there is a concern that an axial body size increases.

SUMMARY OF THE INVENTION

It is an object of the present invention to provide a motorized equipment enabling a design of a controller to be commonly used for electric motors having different output settings. It is another object of the present invention to provide a motorized equipment having a reduced body size.

According to a first example aspect of the present invention, in a motorized equipment, a rotor is provided to be rotatable relative to a stator fixed inside a motor case. A shaft fixed to the rotor is rotatably supported by the motor case. A plurality of power transistors are provided on one axial side of the shaft outside the motor case. The power transistors are electrically connected with extraction lines extending from a coil wound around the stator or the rotor. The power transistors supply a drive current to the coil. A control board for controlling switching of the power transistors is provided on a rotor side of the power transistors outside the motor case. A heat sink for absorbing a heat generated by the power transistors is provided on the other side of the control board opposite to the rotor side outside the motor case.

The heat sink is provided on the side of the control board opposite to the motor case. Therefore, when a design of an output of an electric motor, which is composed of the motor case, the stator, the rotor, the shaft and the like, is changed, only setting of a heat capacity of the heat sink can be changed without changing a positional relationship between the electric motor and the control board and a positional relationship between the electric motor and the power transistors. Therefore, designs of connecting points between the extraction lines extending from the coil and terminals of a power module and the like can be commonly used for electric motors having different output settings. Therefore, a series of motorized equipments corresponding to settings of various outputs can be released. As a result, a manufacturing cost of the motorized equipment can be reduced.

According to a second example aspect of the present invention, a magnet is provided on one axial end portion of the shaft. A position sensor is provided to the control board for outputting a signal corresponding to a direction of a magnetic field generated by the magnet. Therefore, when the setting of the output of the electric motor is changed, a design of the position sensor provided to the control board can be used commonly without changing length of the shaft protruding from the motor case to the control board side. Since the length of the shaft can be reduced, axial runout of the shaft can be inhibited and sensing accuracy of the position sensor can be improved.

According to a third example aspect of the present invention, the power transistors and the control board are fixed to the heat sink. The heat sink and the motor case are connected with each other. Therefore, when a failure arises in either one of the electric motor and the controller, the side causing the failure can be easily replaced. Accordingly, the manufacturing cost can be reduced.

According to a fourth example aspect of the present invention, the power transistors are inserted in a resin mold, which is molded in the shape of a plate, together with wirings connecting the power transistors by resin molding, thereby forming a power module. The control board, the power module and the heat sink are arranged in this order from the motor case side along the axial direction of the shaft. Thus, the control board and the power module are arranged parallel and close to each other. Accordingly, an axial body size of the motorized equipment can be reduced.

According to a fifth example aspect of the present invention, electronic components are provided on a side of the power module opposite to the control board with respect to a board thickness direction of the power module. The electronic components are electrically connected with the wirings connecting the power transistors. The heat sink has a recess for accommodating the electronic components. Thus, when the output of the electric motor is changed, a design of the wirings connecting the electronic components with the power module can be used commonly. In addition, since the electronic components are accommodated in the recess of the heat sink, the axial body size of the motorized equipment can be reduced.

According to a sixth example aspect of the present invention, a shield member is provided between the power module and the position sensor. Thus, even if the distance between the control board, to which the position sensor is provided, and the power module is shortened, malfunction of the position sensor due to an electromagnetic field generated by the power module can be prevented. Therefore, the axial body size of the motorized equipment can be reduced.

According to a seventh example aspect of the present invention, the shield member is inserted in the resin mold together with the power transistors and the wirings connecting the power transistors by the resin molding, thereby forming the power module. Thus, the shield function is incorporated inside the power module. Accordingly, the distance between the control board, to which the position sensor is provided, and the power module can be shortened further.

According to an eighth example aspect of the present invention, the extraction lines extending from the coil extend through holes, which are formed in the control board in a board thickness direction of the control board, and are electrically connected with terminals of the power transistors. Thus, the extraction lines are guided by inner walls of the holes formed in the control board, so the extraction lines and the terminals can be connected easily. By electrically connecting the extraction lines and the control board, the current flowing from the power transistors to the coil can be sensed with a simple construction.

According to a ninth example aspect of the present invention, a cover having a function to shield a radiation noise is provided on a side of the heat sink opposite to the motor case. Thus, the cover prevents an electromagnetic field, which is generated by a large current flowing through the power transistors, from leaking to an outside. The cover also prevents dusts and the like from entering the controller.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, embodiments of the present invention will be described with reference to the drawings.

(First Embodiment)

Figure 6:
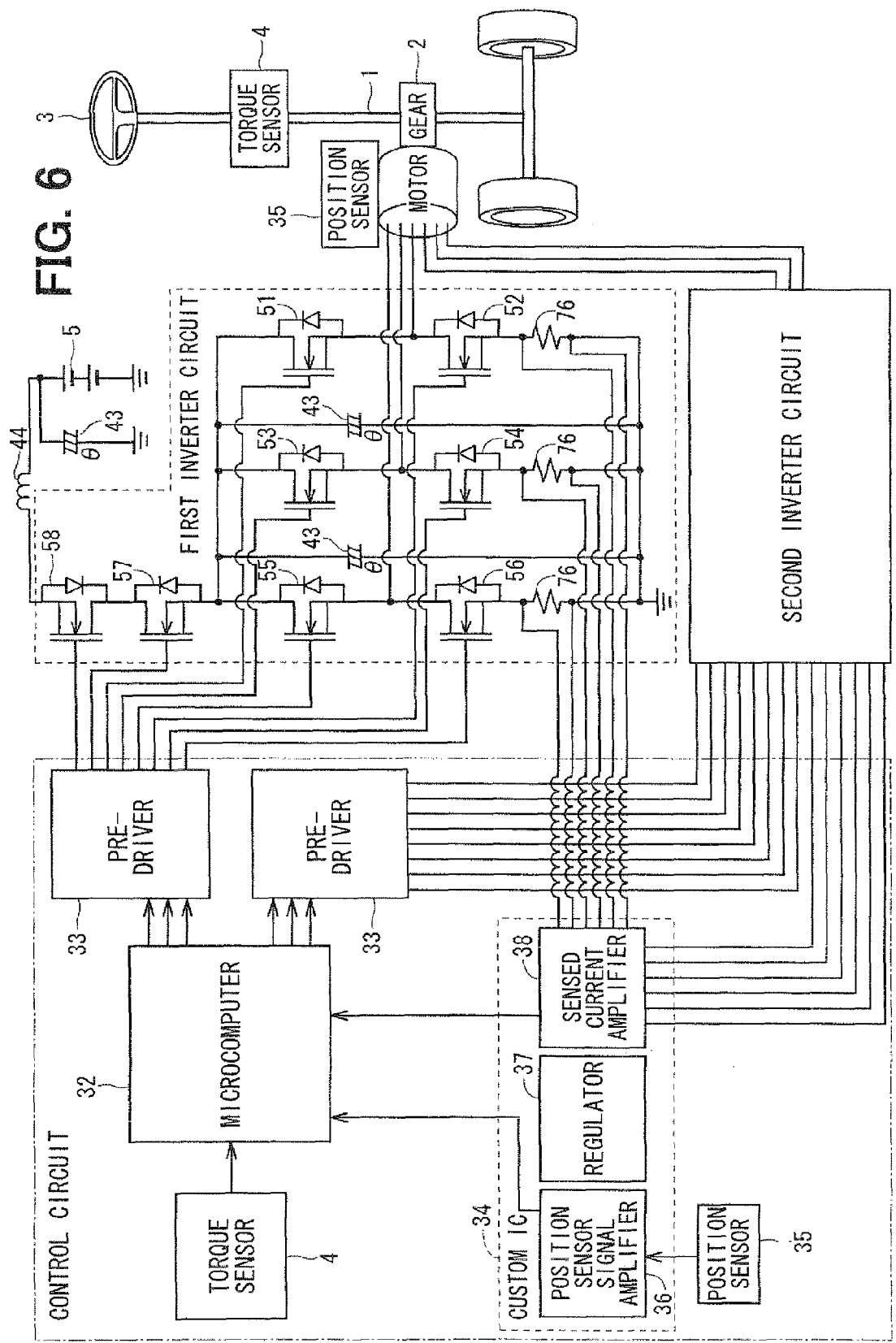
FIG. 6 is a circuit diagram showing the motorized equipment according to the first embodiment.

FIGS. 1 to 19 are diagrams each showing a motorized equipment according to a first embodiment of the present invention. The motorized equipment 10 according to the present embodiment is a brushless motor used for electric power steering. As shown in FIG. 6, the motorized equipment 10 meshes with a gear 2 of a column shaft 1. The motorized equipment 10 performs normal rotation and reverse rotation based on a vehicle speed signal, which is transmitted from CAN and the like, and a torque signal outputted from a torque sensor 4, which senses steering torque of a steering 3. Thus, the motorized equipment 10 generates a force for assisting steering.

Figure 1:
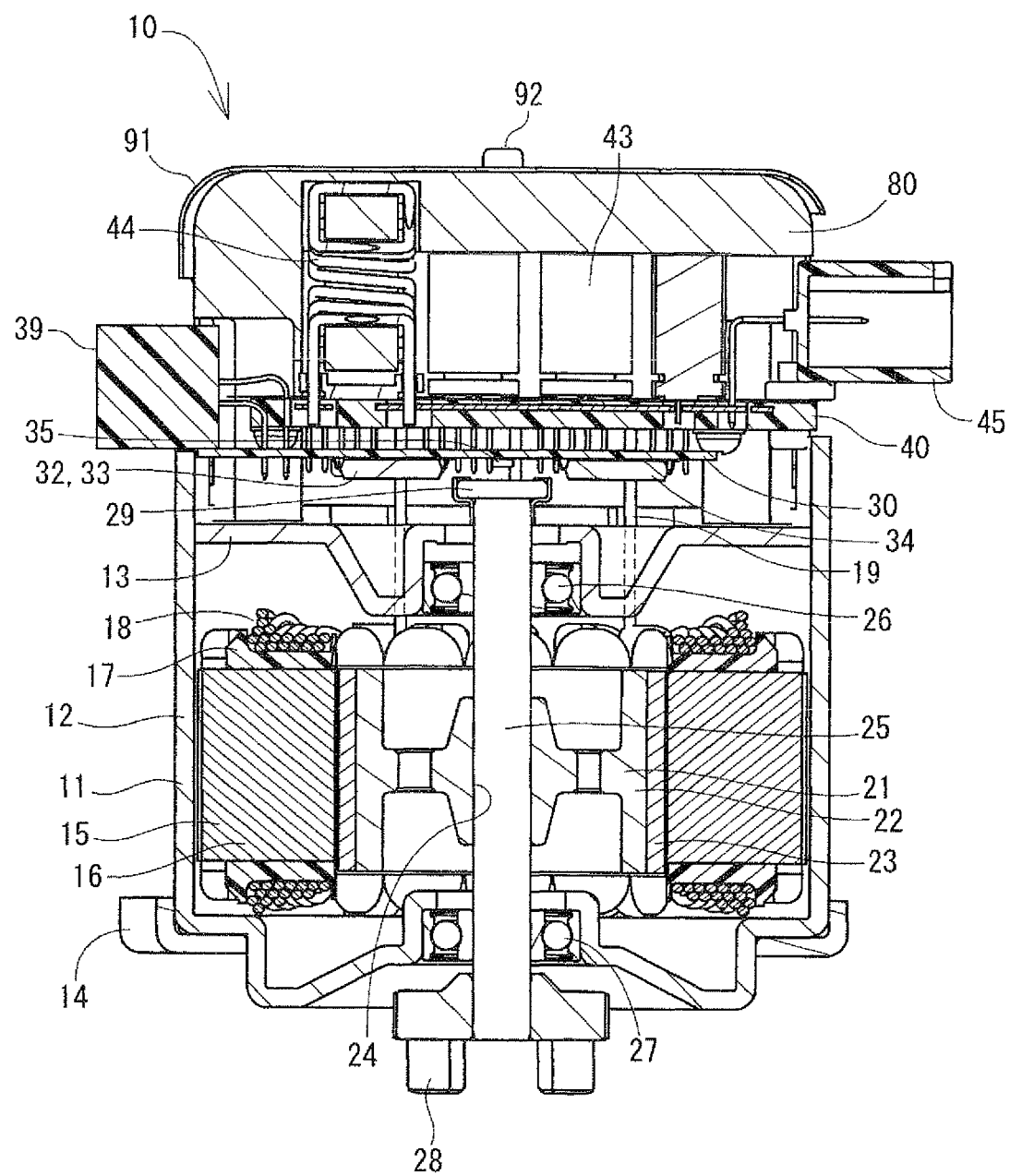
FIG. 1 is a cross-sectional view showing a motorized equipment according to a first embodiment of the present invention.
Figure 2:
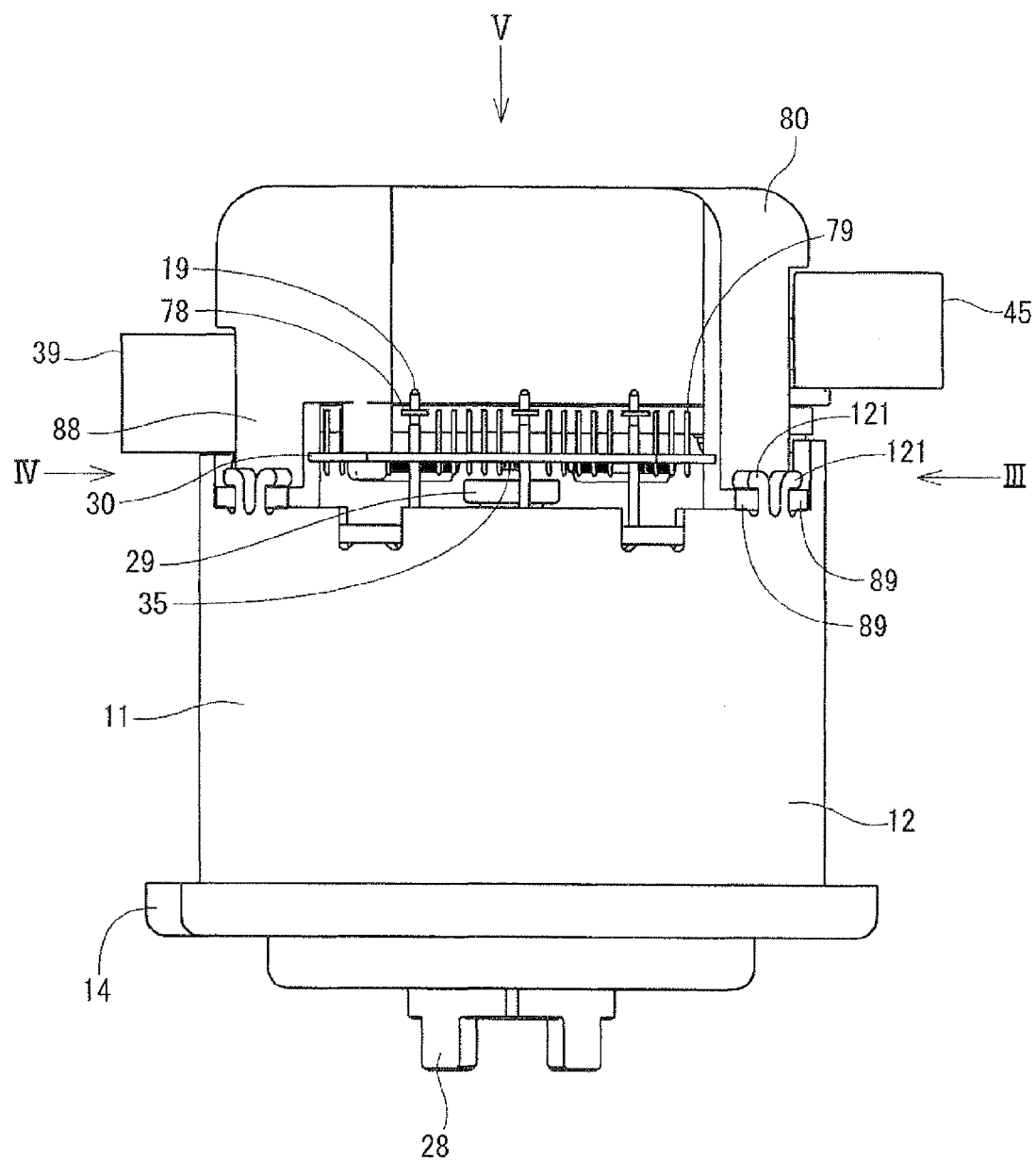
FIG. 2 is a side view showing the motorized equipment according to the first embodiment.
Figure 3:
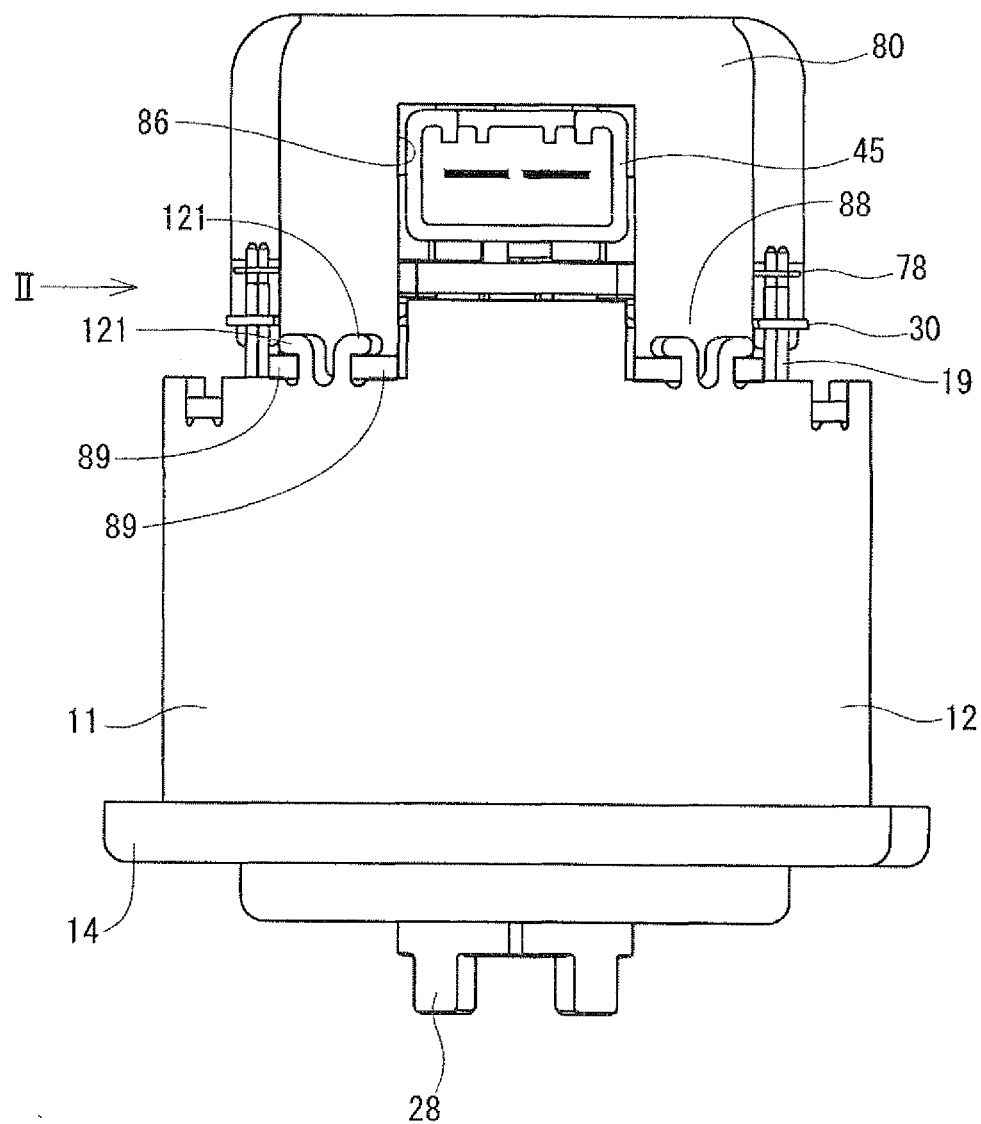
FIG. 3 is a view showing the motorized equipment of FIG. 2 along a direction of an arrow mark III.
Figure 4:
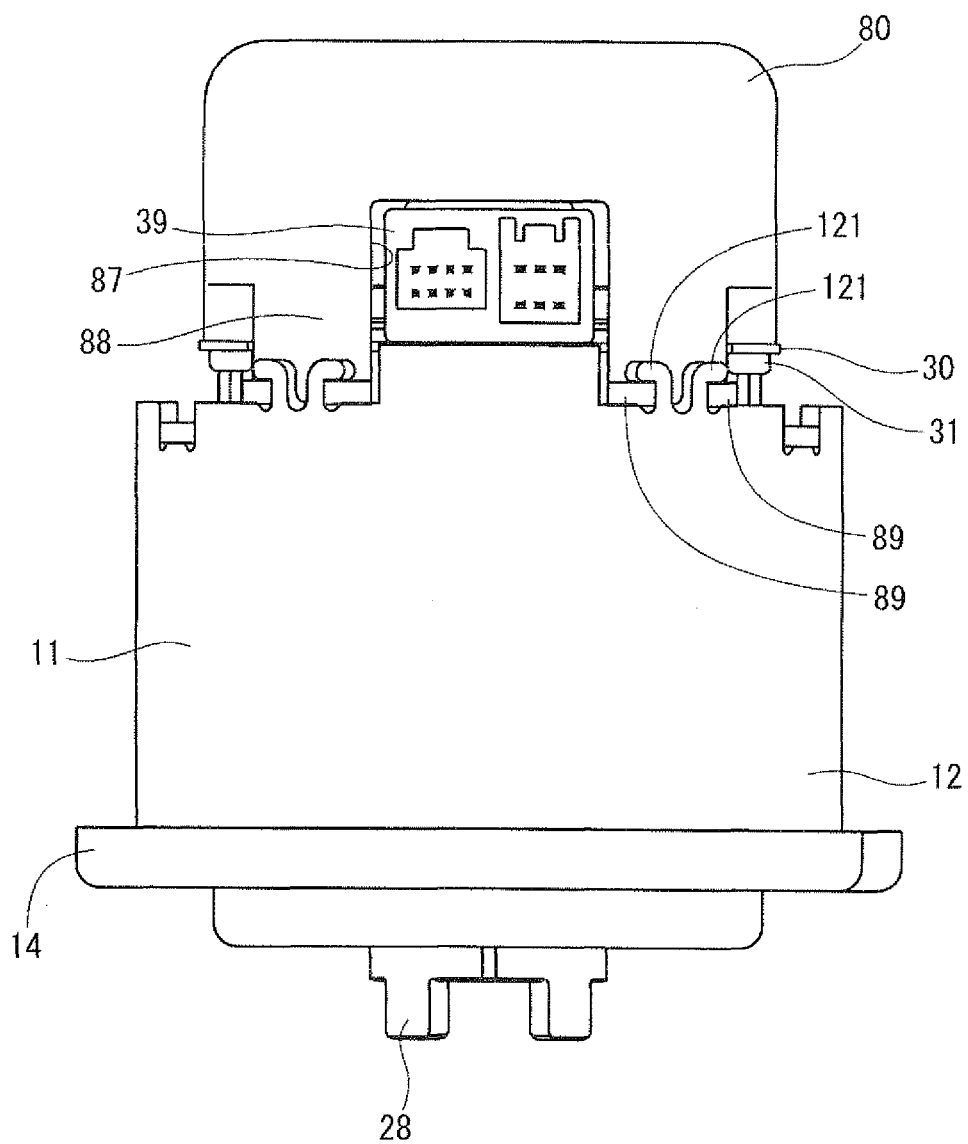
FIG. 4 is a view showing the motorized equipment of FIG. 2 along a direction of an arrow mark IV.
Figure 5:
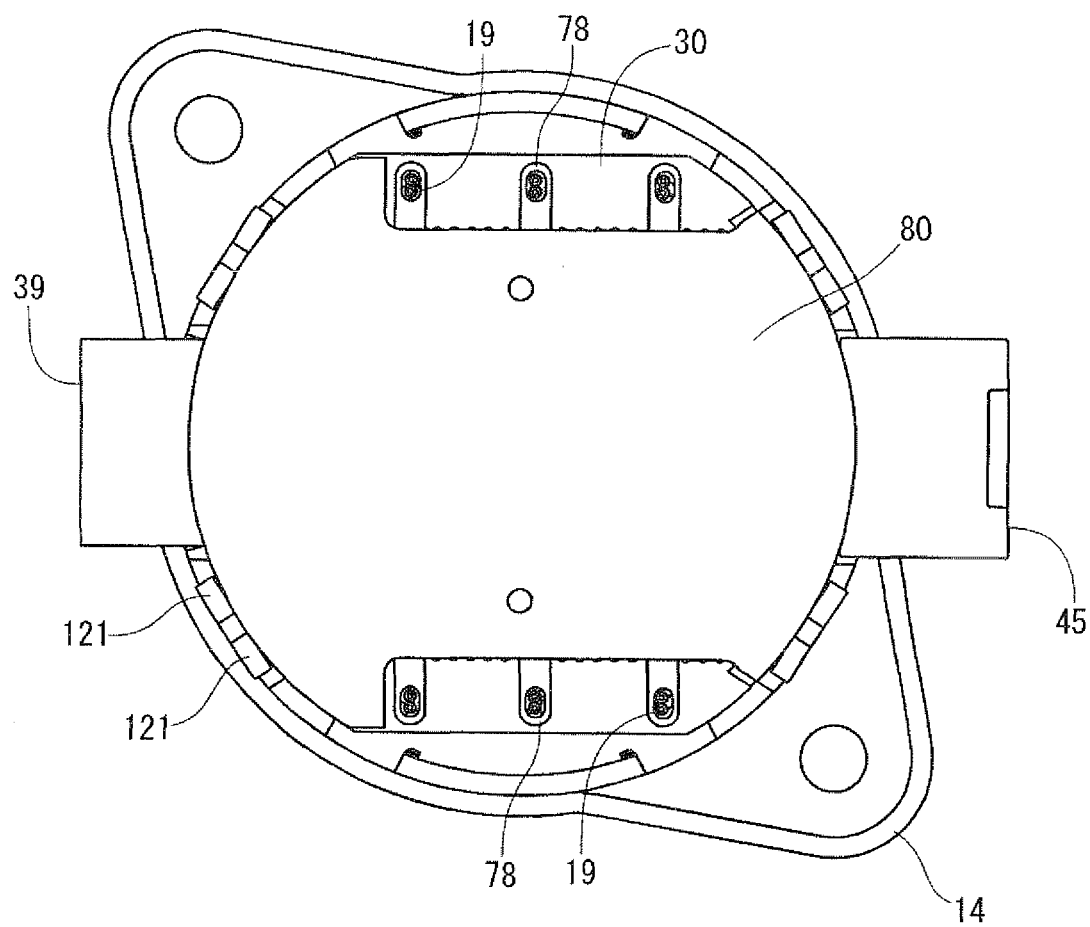
FIG. 5 is a view showing the motorized equipment of FIG. 2 along a direction of an arrow mark V.
Figure 7:
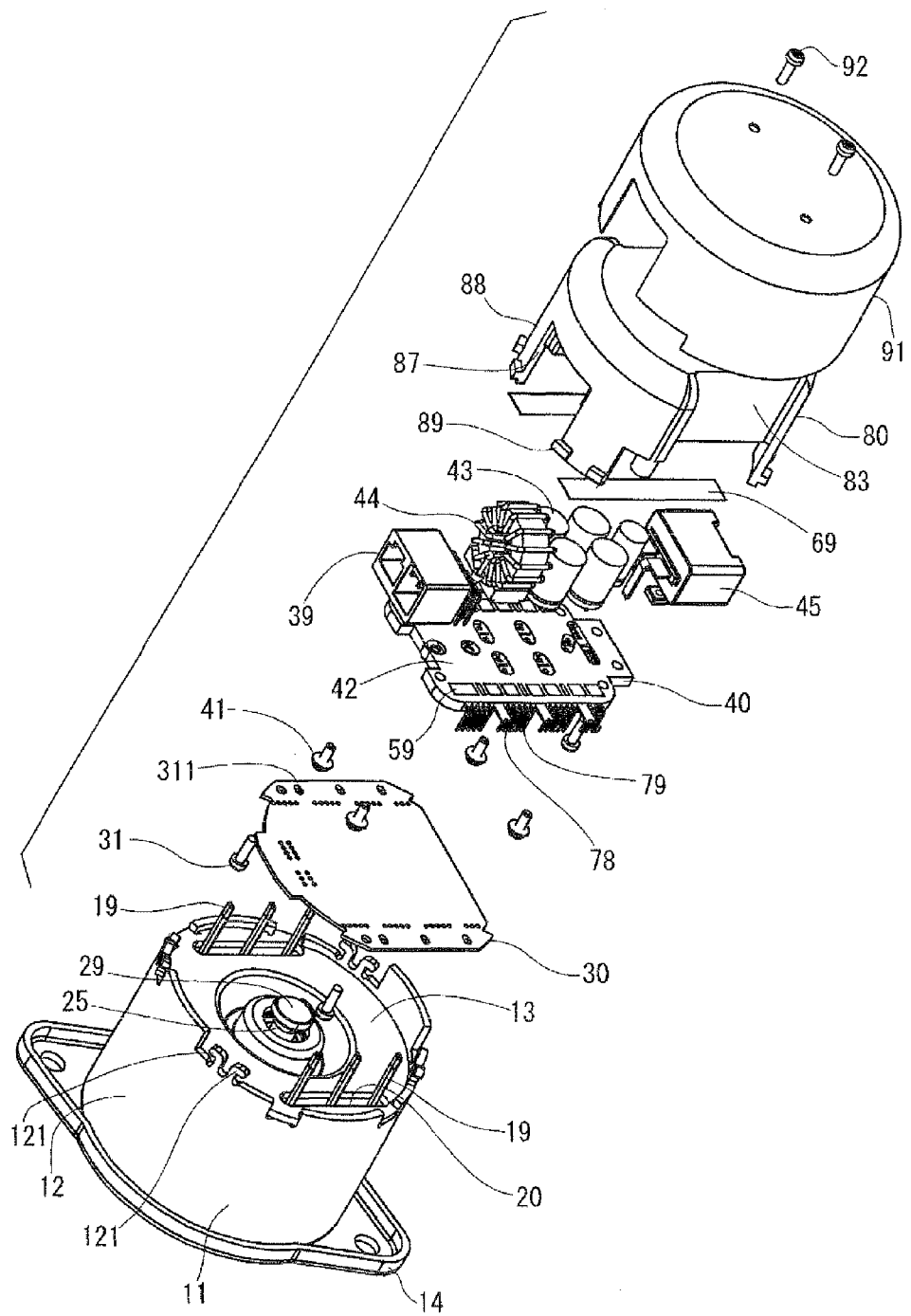
FIG. 7 is an exploded perspective view showing the motorized equipment according to the first embodiment.
Figure 8:
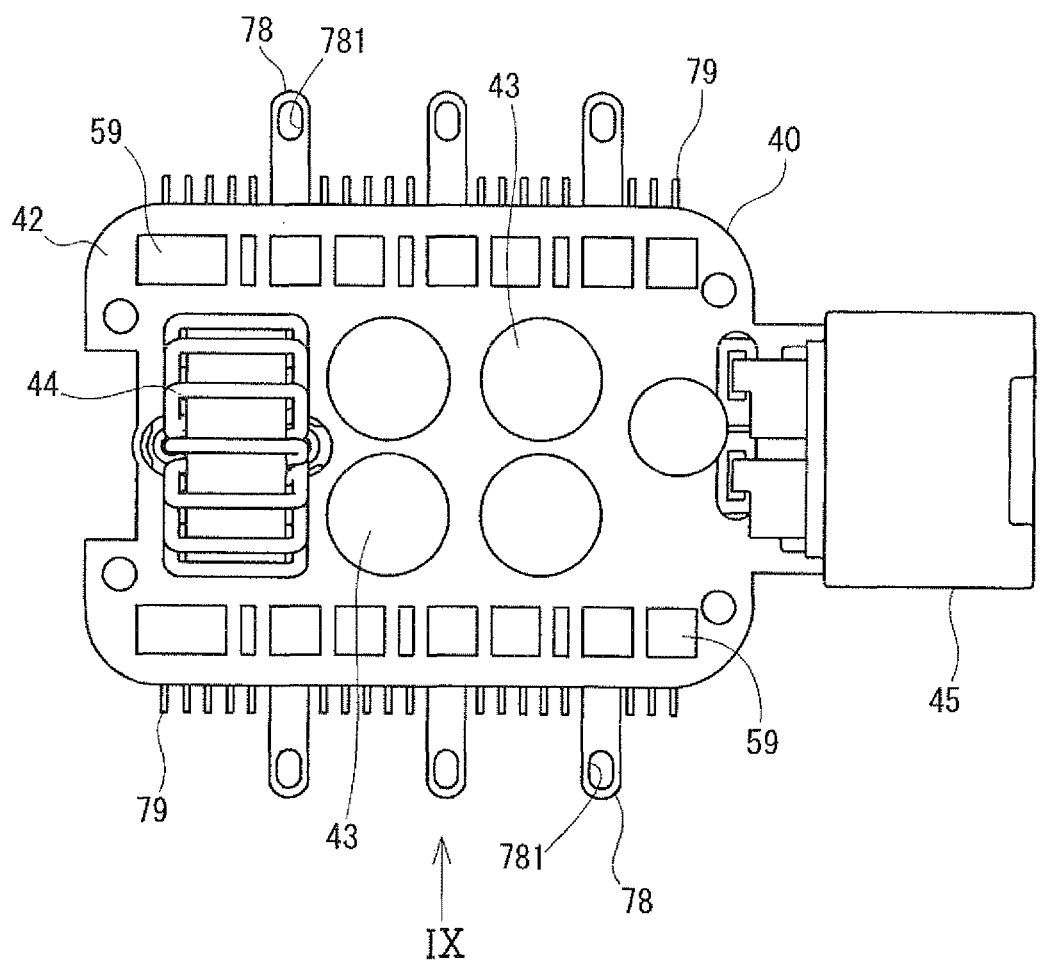
FIG. 8 is a plan view showing a power module and electronic components of the motorized equipment according to the first embodiment.
Figure 9:
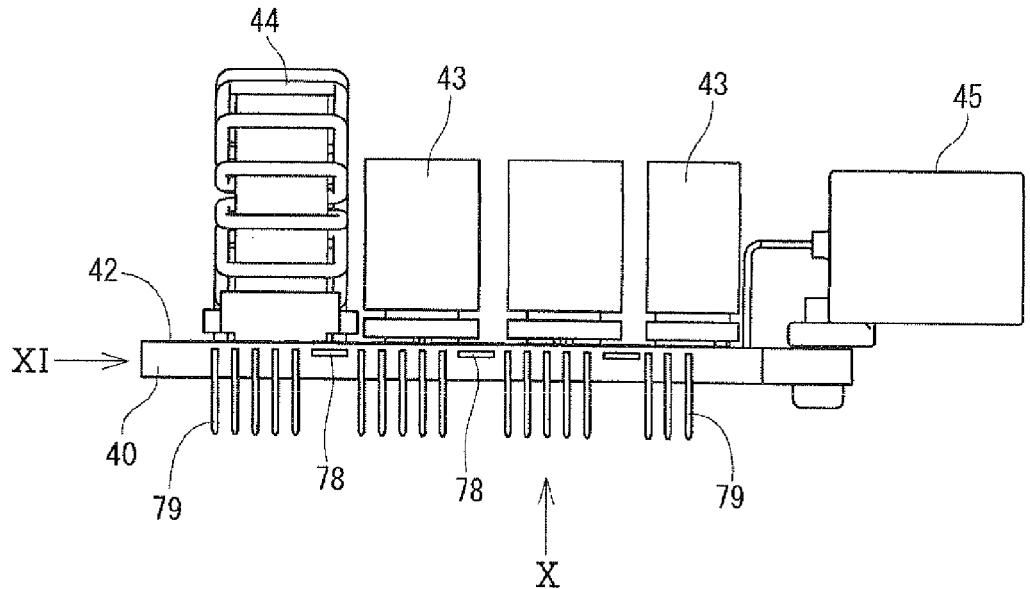
FIG. 9 is a view showing the power module and the electronic components of FIG. 8 along a direction of an arrow mark IX.
Figure 10:
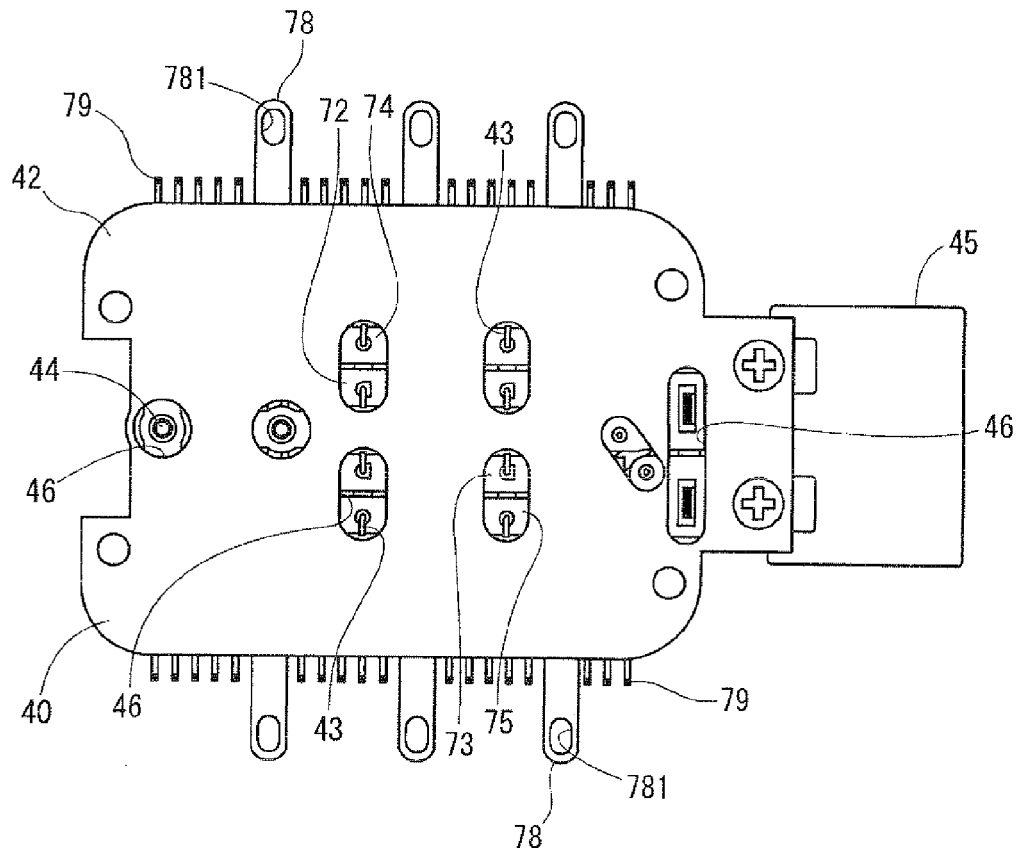
FIG. 10 is a view showing the power module and the electronic components of FIG. 9 along a direction of an arrow mark X.
Figure 11:
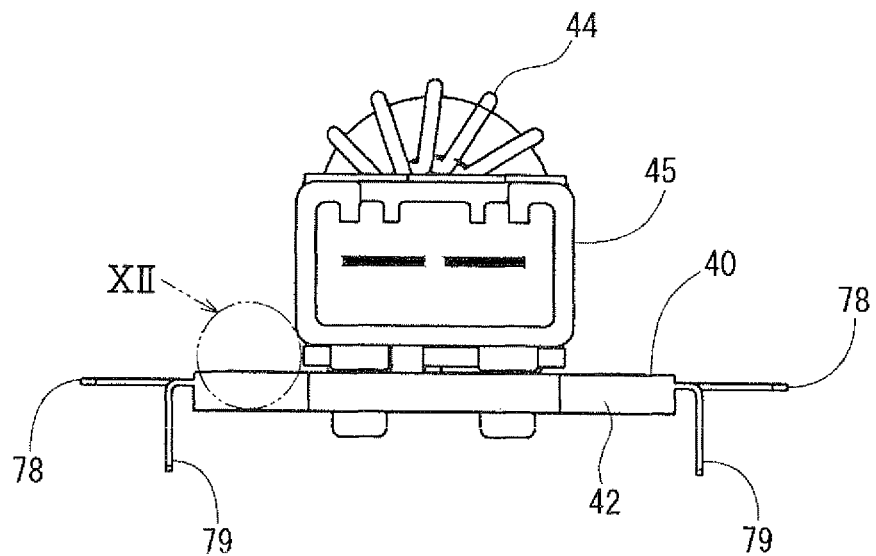
FIG. 11 is a view showing the power module and the electronic components of FIG. 9 along a direction of an arrow mark XI.

FIG. 1 is a cross-sectional view showing the motorized equipment 10 according to the present embodiment. FIGS. 2 to 5 are views each showing outer appearance of the motorized equipment 10 according to the present embodiment. FIG. 7 is an exploded perspective view showing the motorized equipment 10 according to the present embodiment. The motorized equipment 10 has an electric motor and a controller. The electric motor is composed of a motor case 11, a stator 15, a rotor 21, a shaft 25 and the like. The controller is composed of a control board 30, a power module 40, a heat sink 80 and the like.

First, the electric motor will be explained. The motor case 11 is made of iron or the like. The motor case 11 consists of a first motor case 12 in the shape of a cylinder with bottom and a second motor case 13 blocking an opening of the first motor case 12 on a controller side. A frame end 14 made of aluminum is fixed to an outer wall of the bottom portion of the first motor case 12.

The stator 15 is accommodated on a radially inside wall of the first motor case 12. The stator 15 has salient poles 16 and slots (not shown) arranged alternately in a circumferential direction. A coil 18 is accommodated in the slots of the stator 15 across an insulator 17. The coil 18 is wound around the salient poles 16. The coil 18 provides two systems of three-phase winding. Extraction lines 19 extending from the coil 18 extend through holes 20 formed in the second motor case 13 in a board thickness direction of the second motor case 13 and extend to the controller side.

The rotor 21 is rotatably provided radially inside the stator 15. The rotor 21 has permanent magnets 23 provided radially outside a rotor core 22. The permanent magnets 23 are magnetized such that magnetic poles of the permanent magnets 23 alternate along a circumferential direction. The shaft 25 is fixed to a shaft hole 24 formed in a rotational center of the rotor 21. One axial end of the shaft 25 is fitted to a bearing 26 provided in the second motor case 13, and the other axial end of the shaft 25 is fitted to a bearing 27 provided in the bottom portion of the first motor case 12. Axial body sizes of the stator 15 and the rotor 21 are set according to a required output of the electric motor.

With such the construction, if the coil 18 is energized, a rotational magnetic field is formed. Thus, the rotor 21 and the shaft 25 perform normal rotation or reverse rotation with respect to the stator 15 and the motor case 11. A drive force is outputted from an output end 28 of the shaft 25 on a frame end 14 side to the gear 2 of the column shaft 1.

Next, the controller will be explained. As shown in FIG. 7, the controller is constructed of the control board 30, the power module 40, the heat sink 80 and a cover 91, which are arranged in this order on the one axial end side of the shaft 25 of the motor. A choke coil 44 and aluminum electrolytic capacitors 43 are electrically connected with wirings of the power module 40 along a board thickness direction of the power module 40. The control board 30 and the power module 40 are fixed to the heat sink 80 with screws 31, 41 respectively. Radiator plates 59 of power transistors are exposed from a mold resin 42 of the power module 40 along the board thickness direction of the power module 40. The radiator plates 59 are closely fixed to the heat sink 80 across insulation radiation sheets 69.

Figure 12:
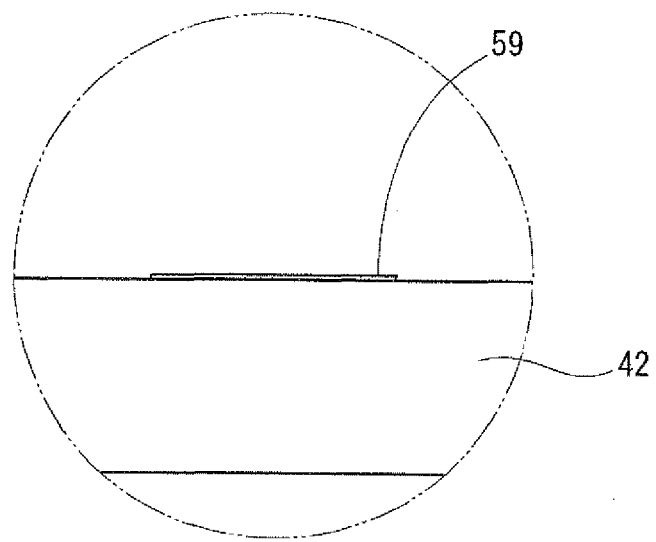
FIG. 12 is an enlarged partial view showing a part of the power module and the electronic components of FIG. 11 indicated by a circle XII.
Figure 13:
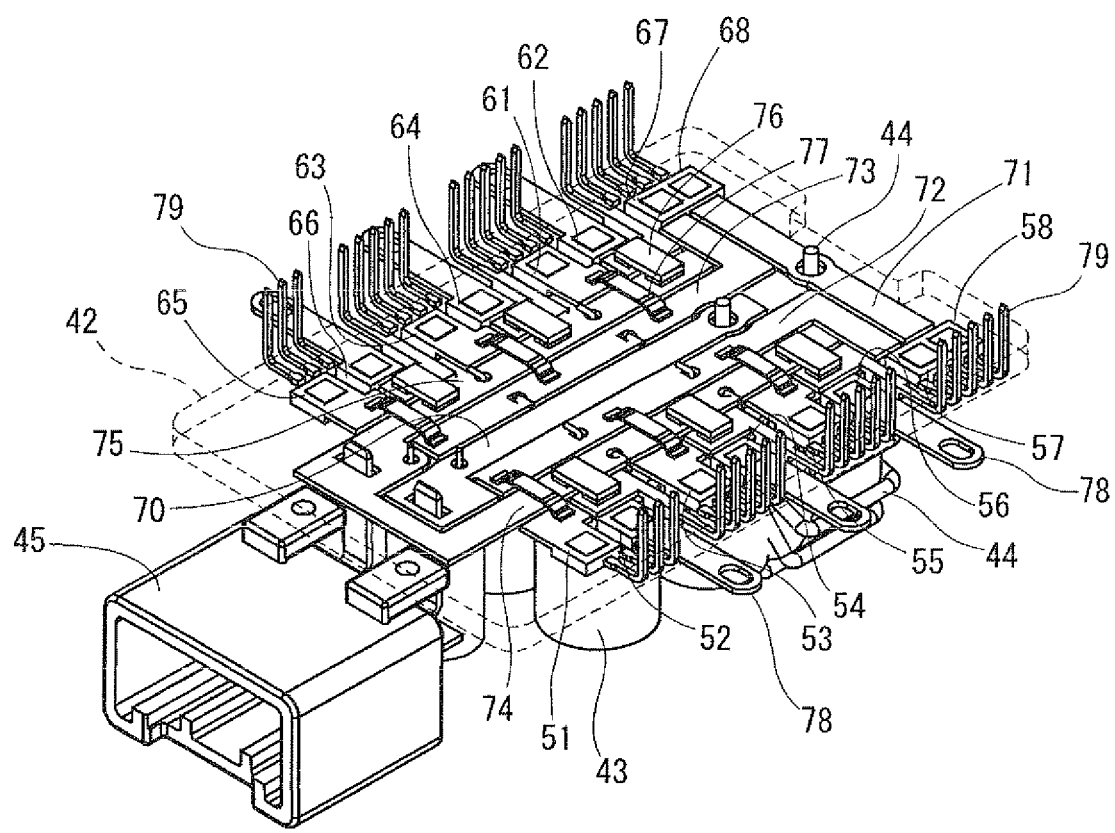
FIG. 13 is a perspective view showing the power module and the electronic components except a resin mold according to the first embodiment.

A construction of the power module 40 is shown in FIGS. 8 to 13. In FIG. 13, the mold resin 42 is shown by broken lines. The power module 40 is formed by molding a resin into the shape of a substantially rectangular plate, in which twelve power transistors 51-56, 61-66 constituting two sets of inverter circuits, four power transistors 57, 58, 67, 68 for circuit protection, wirings 70-75 for connecting the power transistors 51-58, 61-68, shunt resistances 76, jumper wirings 77 and the like are inserted.

The power transistors 51-58, 61-68 and the wirings 70-75 are arranged on the same plane. The power transistors 51-58, 61-68 form two sets of inverter circuits. The eight power transistors 51-58 constituting one set of the inverter circuit are arranged in line on one long side. The eight power transistors 61-68 constituting the other set of the inverter circuit are arranged in line on the other long side. As shown in FIG. 12, the radiator plates 59 of the power transistors 51-58, 61-68 are exposed on an outer wall of the mold resin 42 in the board thickness direction of the mold resin 42.

Terminals 78 and signal wirings 79 connected with the power transistors 51-58, 61-68 protrude to an outside from outer walls of the long sides of the power module 40. The terminals 78 are electrically connected with the extraction lines 19 of the coil 18. The signal wirings 79 are electrically connected with wirings of the control board 30.

The aluminum electrolytic capacitors 43 and the choke coil 44 as electronic components are provided to the power module 40 along the board thickness direction of the power module 40. The aluminum electrolytic capacitors 43 are electrically connected with the wirings 72-75 and absorb ripple currents generated by switching of the power transistors 51-58, 61-68. The choke coil 44 is electrically connected with the wirings 70, 71 to attenuate fluctuation of power supply supplied to the power transistors 51-58, 61-68.

A first connector 45 is provided to an end portion of the power module 40 on one short side of the power module 40.

Current is supplied from a battery 5 to the power module 40 through the first connector 45.

The current supplied from the battery 5 to the first connector 45 flows from the wiring 70 in the center of the power module 40 to the wiring 71 on the short side opposite to the first connector 45 via the choke coil 44. Then, the current flows from the wiring 71 to the wirings 72, 73 provided on both left and right sides of the central wiring 70 via the circuit protection power transistors 57, 58, 67, 68 provided in both ends on the long sides. Then, the current flows from the wirings 72, 73 to the coil 18 via the jumper wirings 77, the power transistors 51, 53, 55, 61, 63, 65 on a power supply side and the extraction lines 19 connected to the terminals 78. The current returning from the coil 18 flows from the terminals 78 to the wirings 74, 75 inside the power transistors 51-56, 61-66 via the power transistors 52, 54, 56, 62, 64, 66 on a ground side and the shunt resistances 76. Then, the current flows from the wirings 74, 75 to the battery 5 via the first connector 45.

The inverter circuits formed in the power module 40 are shown in FIG. 6. FIG. 6 shows one set of the inverter circuit formed by the six power transistors 51-56 and the like. A circuit diagram of the other set of the inverter circuit is omitted in FIG. 6. The two sets of the inverter circuits generate a three-phase alternating current as a drive current supplied to the coil 18, which forms two systems of the three-phase winding.

Figure 14:
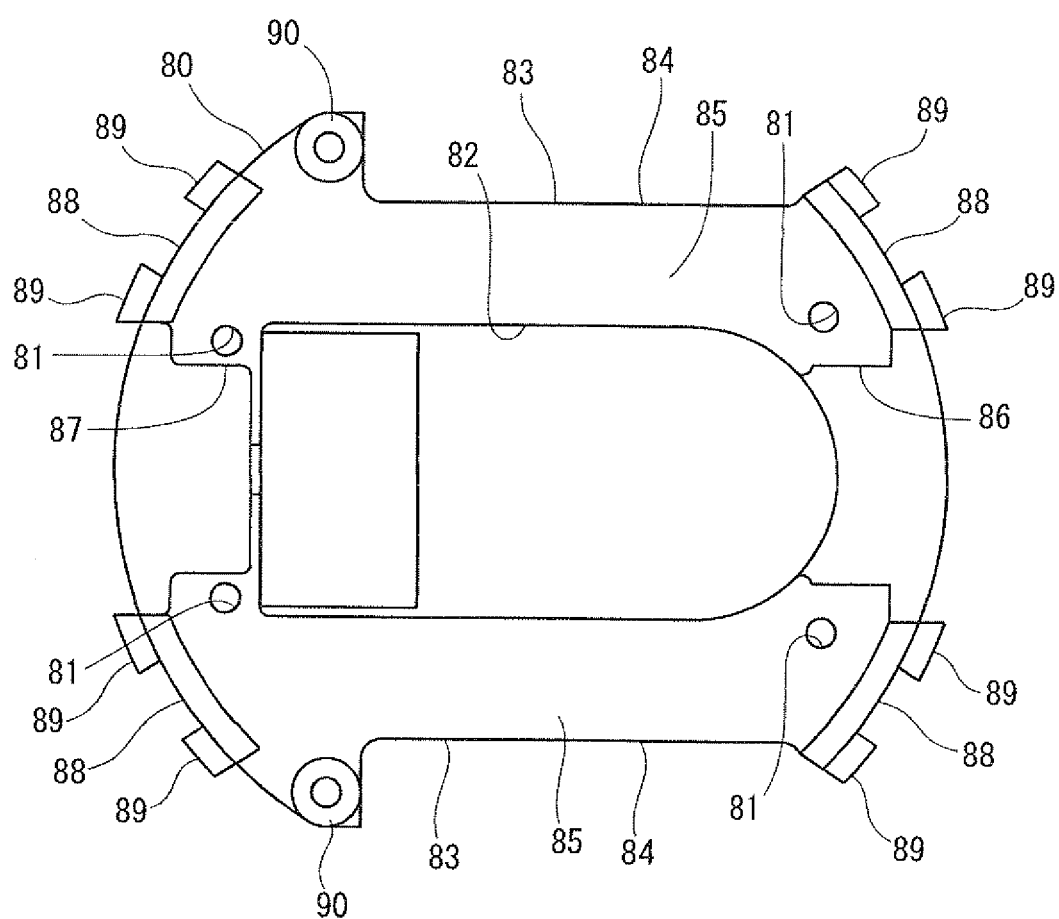
FIG. 14 is a bottom view showing a heat sink of the motorized equipment according to the first embodiment.
Figure 15:
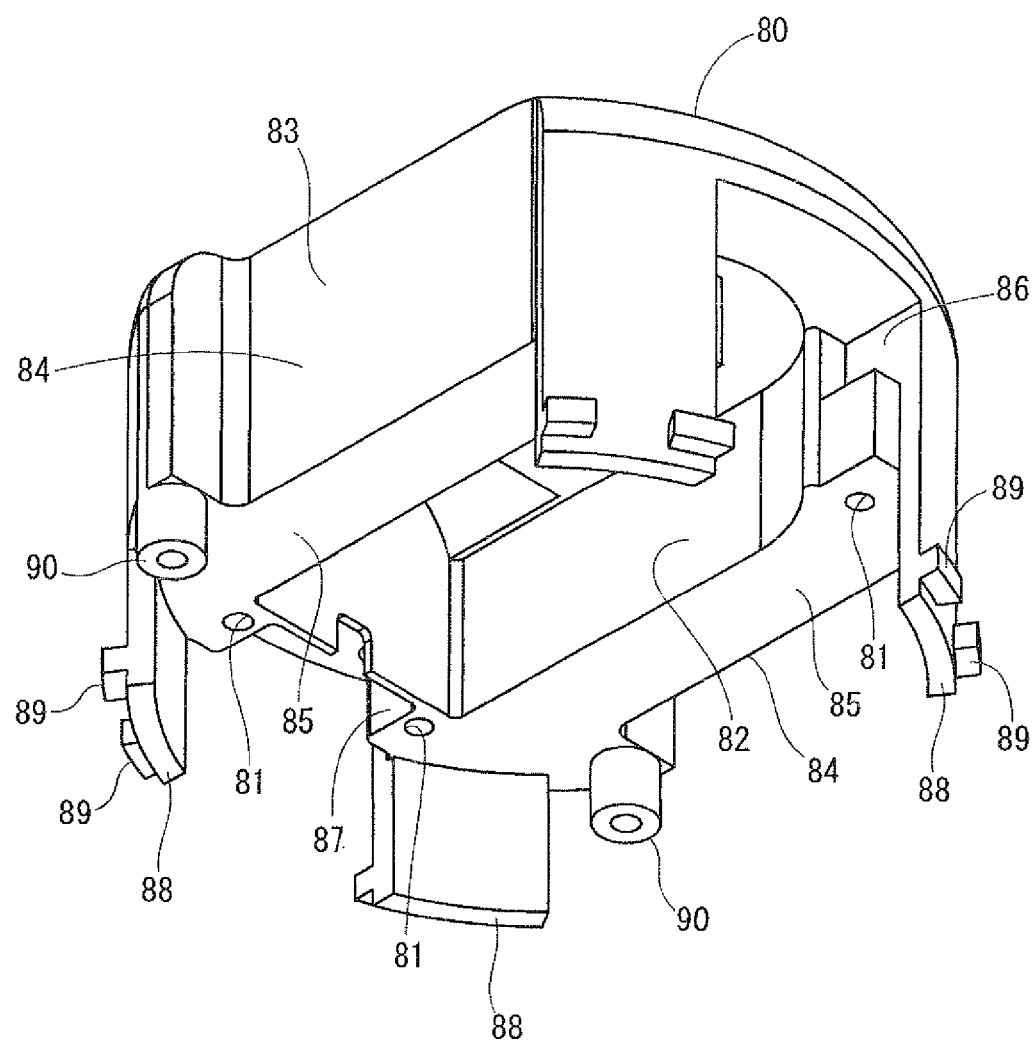
FIG. 15 is a perspective view showing the heat sink according to the first embodiment.
Figure 16:
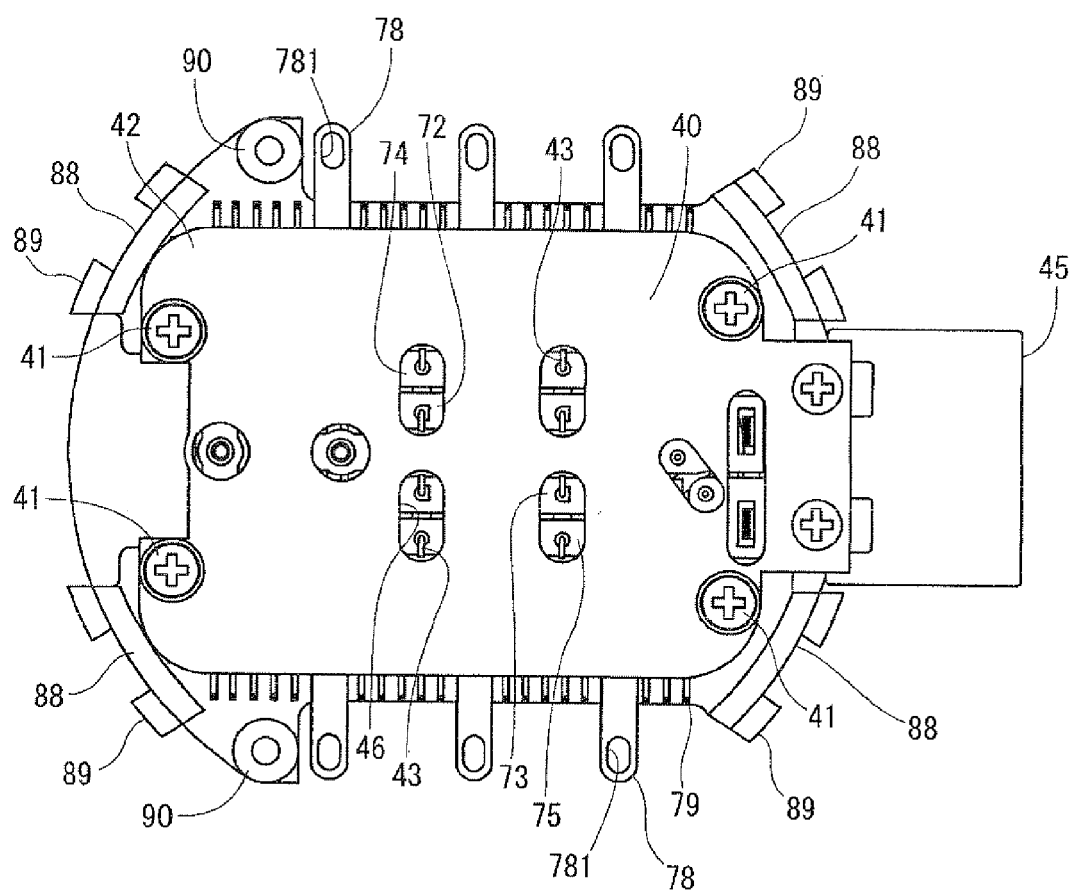
FIG. 16 is a bottom view showing the power module attached to the heat sink according to the first embodiment.
Figure 17:
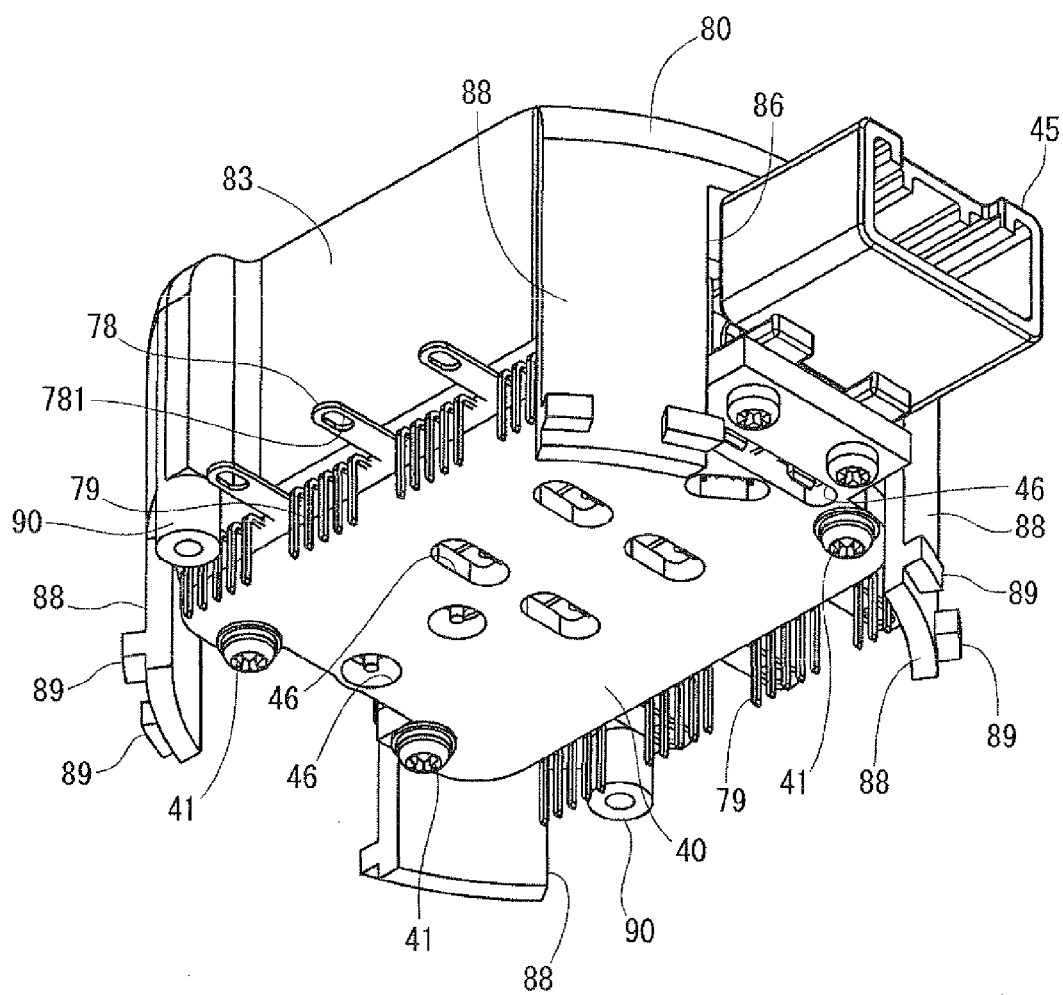
FIG. 17 is a perspective view showing the power module attached to the heat sink according to the first embodiment.

As shown in FIGS. 14 and 15, the heat sink 80 is made of a material such as aluminum having high heat conductivity. The heat sink 80 is formed to have a volume having a heat capacity capable of absorbing the heat generated by the power module 40 according to the output of the electric motor.

The heat sink 80 has a recess 82 in its central portion. The recess 82 is formed to have a size capable of accommodating the aluminum electrolytic capacitors 43 and the choke coil 44. The heat sink 80 has flat surface sections 83 at positions substantially and axially overlapping with the long sides of the power module 40, which is radially outside the heat sink 80. Thus, the terminals 78 protruding outward from the long sides of the power module 40 can be connected with the extraction lines 19 of the coil 18.

The heat sink 80 has columnar members 84, each of which is interposed between the recess 82 and the flat surface section 83. Heat receiving surfaces 85 are formed on the columnar members 84 on a power module 40 side. The heat receiving surfaces 85 contact the radiator plates 59 of the power transistors 51-58, 61-68 across the insulation radiation sheets 69. Thus, the heat generated by the power module 40 transfers to the heat sink 80.

The heat sink 80 has openings 86, 87 at positions corresponding to the first connector 45 of the power module 40 and a second connector 39 of the control board 30 (explained in detail later). The heat sink 80 has four support members 88 between the openings 86, 87 and the flat surface sections 83. The support members 88 extend toward an electric motor side in the axial direction.

The control board 30 is provided on a second motor case 13 side of the power module 40 substantially parallel to the power module 40 as shown in FIGS. 1 to 4, 18 and 19. The control board 30 is made of a material such as a glass epoxy substrate and is electrically connected with the signal wirings 79 protruding from the power module 40. The control board 30 has the second connector 39 on a side opposite to the first connector 45 of the power module 40. The control board 30 has holes 311, through which the extraction lines 19 are passed, at positions overlapping with holes 781 of the terminals 78 of the power module 40 in the axial direction.

A microcomputer 32, pre-drivers 33, a custom IC 34, a position sensor 35 and the like are mounted on the control board 30. The position sensor 35 is mounted on the second motor case 13 side of the control board 30. The position sensor 35 outputs a signal corresponding to a direction of a magnetic field generated by a magnet 29 arranged on the one end portion of the shaft 25.

As shown in FIG. 6, the custom IC 34 has a position sensor signal amplifier 36, a regulator 37 and a sensed current amplifier 38 as functional blocks. The signal outputted by the position sensor 35 is amplified by the position sensor signal amplifier 36 and is inputted to the microcomputer 32. Thus, the microcomputer 32 senses a position of the rotor 21 fixed to the shaft 25.

The torque signal outputted from the torque sensor 4 and the like are inputted to the microcomputer 32 via the second connector 39. The currents of the inverter circuit sensed by the shunt resistances 76 are inputted to the microcomputer 32 via the sensed current amplifier 38.

The microcomputer 32 assists steering of the steering 3 according to vehicle speed based on the signals from the position sensor 35, the torque sensor 4, the shunt resistances 76 and the like. Therefore, the microcomputer 32 outputs pulse signals, which are produced by PWM control, to the power transistors 51-56, 61-66 via the pre-drivers 33. Thus, the two sets of the inverter circuits formed by the power transistors convert the current, which is supplied from the battery 5 via the choke coil 44 and the circuit protection power transistors 57, 58, 67, 68, into the three-phase current and supply the three-phase current to the coil 18 from the extraction lines 19 connected to the terminals 78.

Next, an assembling method of the electric motor and the controller according to the present embodiment will be explained. First, as shown in FIGS. 7 to 11, the aluminum electrolytic capacitors 43, the choke coil 44, the first connector 45 and the like are attached to the wirings 70-75 of the power module 40, in which the power transistors 51-58, 61-68, the wirings 70-75 and the like are inserted by the resin molding. The connection between these electronic components and the wirings 70-75 is performed through holes 46 formed in the bottom of the power module 40 by a welding process or a soldering process.

Then, as shown in FIGS. 7 and 14 to 17, the power module 40 is attached to the heat sink 80. The power module 40 is attached to the heat sink 80 by fixing the power module 40 to holes 81 formed in a bottom of the heat sink 80 by the screws 41. At that time, the insulation radiation sheets 69 are inserted between the radiator plates 59 of the power transistors 51-58, 61-68 and the heat receiving surfaces 85 of the heat sink 80. If the power module 40 is attached to the heat sink 80, the aluminum electrolytic capacitors 43 and the choke coil 44 are inserted into the recess 82 of the heat sink 80. The first connector 45 protrudes from the opening 86 of the heat sink 80 to the outside of the heat sink 80.

Figure 18:
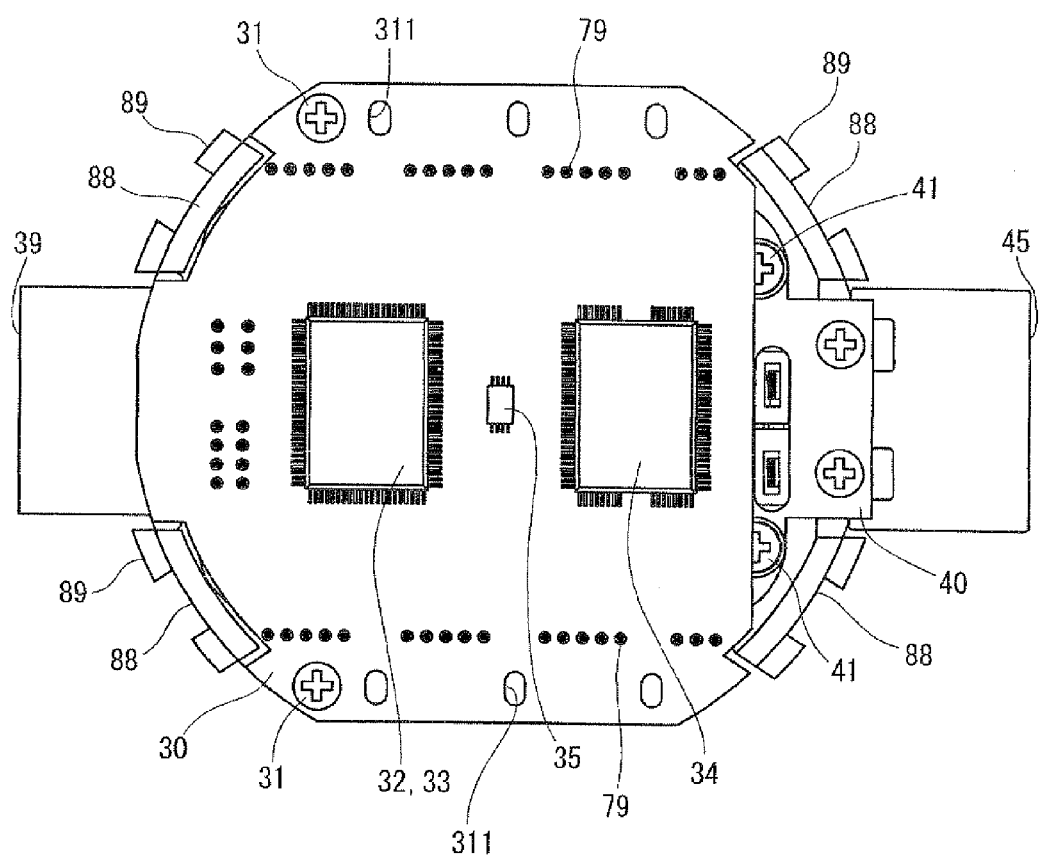
FIG. 18 is a bottom view showing the power module and a control board attached to the heat sink according to the first embodiment.
Figure 19:
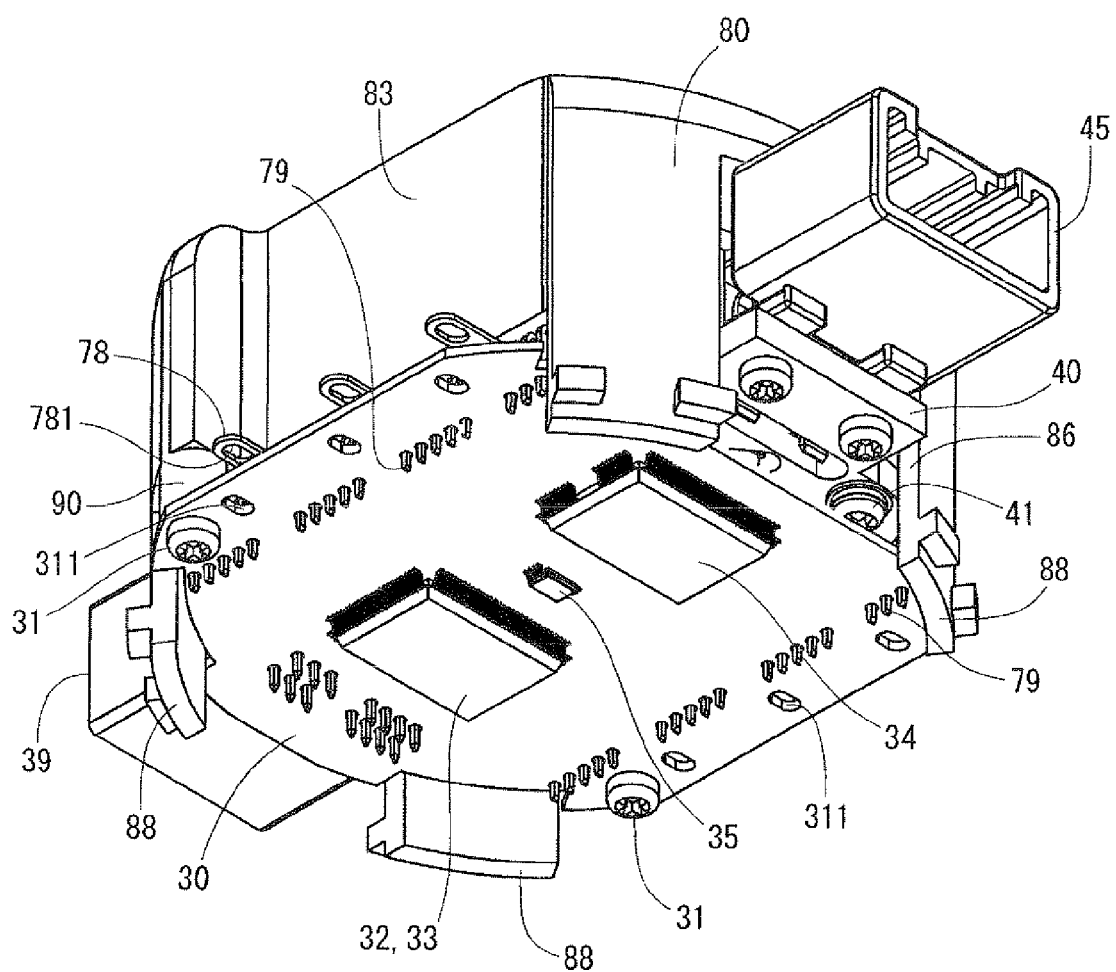
FIG. 19 is a perspective view showing the power module and the control board attached to the heat sink according to the first embodiment.

Then, as shown in FIGS. 18 and 19, the control board 30 is attached to the heat sink 80. The control board 30 is attached to the heat sink 80 by fixing the control board 30 to columns 90 extending from the heat sink 80 in the axial direction with the screws 31. Then, the signal wirings 79 of the power module 40 are electrically connected to the wirings of the control board 30 by the soldering process or the welding process. At that time, the second connector 39 protrudes from the opening 87 of the heat sink 80 to the outside of the heat sink 80.

Then, as shown in FIGS. 2 to 5, the heat sink 80 is attached to the electric motor. The heat sink 80 is attached to the electric motor by bringing axial end portions of the support members 88 of the heat sink 80 on the electric motor side and an axial end portion of the first motor case 12 on the controller side into contact with each other. Claws 121 extending from the first motor case 12 in the axial direction are inserted between protrusions 89 formed on the end portions of the support members 88. The claws 121 are bent to the circumferential direction to fix the heat sink 80 and the first motor case 12. Each pair of claws 121 extending parallel to each other are bent to opposite sides of the circumferential direction respectively. At that time, the extraction lines 19 extending through the holes 20 of the second motor case 13 in the axial direction are inserted through the holes 311 of the control board 30 and the holes 781 of the terminals 78 of the power module 40. Then, the extraction lines 19 and the terminals 78 of the power module 40 are electrically connected with each other by the welding process or the soldering process.

Finally, as shown in FIGS. 1 and 7, the heat sink 80 is covered with the cover 91 formed substantially in the shape of a cylinder with bottom. The cover 91 and the heat sink 80 are fixed by screws 92. The cover 91 is made of a magnetic body such as iron and inhibits an electromagnetic field, which is generated by a large current passing through the power transistors 51-58, 61-68, from leaking to the outside. The cover 91 also prevents dusts and the like from entering the controller. Thus, the motorized equipment 10 is completed.

In the present embodiment, the control board 30, the power module 40 and the heat sink 80 constituting the controller of the electric motor are arranged in this order from the motor case side along the axial direction of the shaft 25 of the electric motor.

The heat sink 80 is provided on the side of the control board 30 and the power module 40 opposite to the motor case 11. Therefore, when setting of the output of the electric motor is changed, only setting of the heat capacity of the heat sink 80 can be changed without changing a positional relationship between the electric motor and the control board 30 and a positional relationship between the electric motor and the power module 40. Therefore, designs of the connecting points between the extraction lines 19 extending from the coil 18 and the terminals of the power module 40, the connecting points between the power module 40 and the control board 30 and the like can be commonly used for the electric motors having the different output settings. Therefore, a series of motorized equipments 10 corresponding to settings of various outputs can be released. Thus, a manufacturing cost of the motorized equipment 10 can be reduced.

In the present embodiment, the control board 30 mounted with the position sensor 35 is provided on the second motor case 13 side. Therefore, when the setting of the output of the electric motor is changed, a design of the position sensor 35 provided to the control board 30 can be used commonly without changing the length of the shaft 25 protruding from the second motor case 13 to the control board 30 side. Moreover, since the length of the shaft 25 can be shortened, axial runout of the shaft 25 can be inhibited and sensing accuracy of the position sensor 35 can be improved.

In the present embodiment, the power module 40 and the control board 30 are attached to the heat sink 80, and the heat sink 80 and the first motor case 12 are connected with each other. Therefore, when a failure arises in either one of the electric motor and the controller, the side causing the failure can be replaced with ease. Accordingly, the manufacturing cost can be reduced.

In the present embodiment, the aluminum electrolytic capacitors 43 and the choke coil 44 are provided along the board thickness direction of the power module 40. The aluminum electrolytic capacitors 43 and the choke coil 44 are accommodated inside the recess 82 formed in the heat sink 80. Thus, when the output of the electric motor is changed, a design of the wirings connecting the aluminum electrolytic capacitors 43 and the choke coil 44 with the power module 40 can be used commonly. In addition, since the aluminum electrolytic capacitors 43 and the choke coil 44 are accommodated in the recess 82 of the heat sink 80, an axial body size of the motorized equipment 10 can be reduced.

In the present embodiment, the extraction lines 19 extending from the coil 18 extend through the holes 311 of the control board 30 and are electrically connected with the terminals 78 of the power module 40. Thus, the extraction lines 19 are guided by inner walls of the holes 311 formed in the control board 30, so the extraction lines 19 and the terminals 78 can be connected easily. By electrically connecting the extraction lines 19 and the control board 30 with each other, the currents flowing from the power transistors 51-56, 61-66 to the coil 18 can be sensed with a simple construction.

(Second Embodiment)

Figure 20:
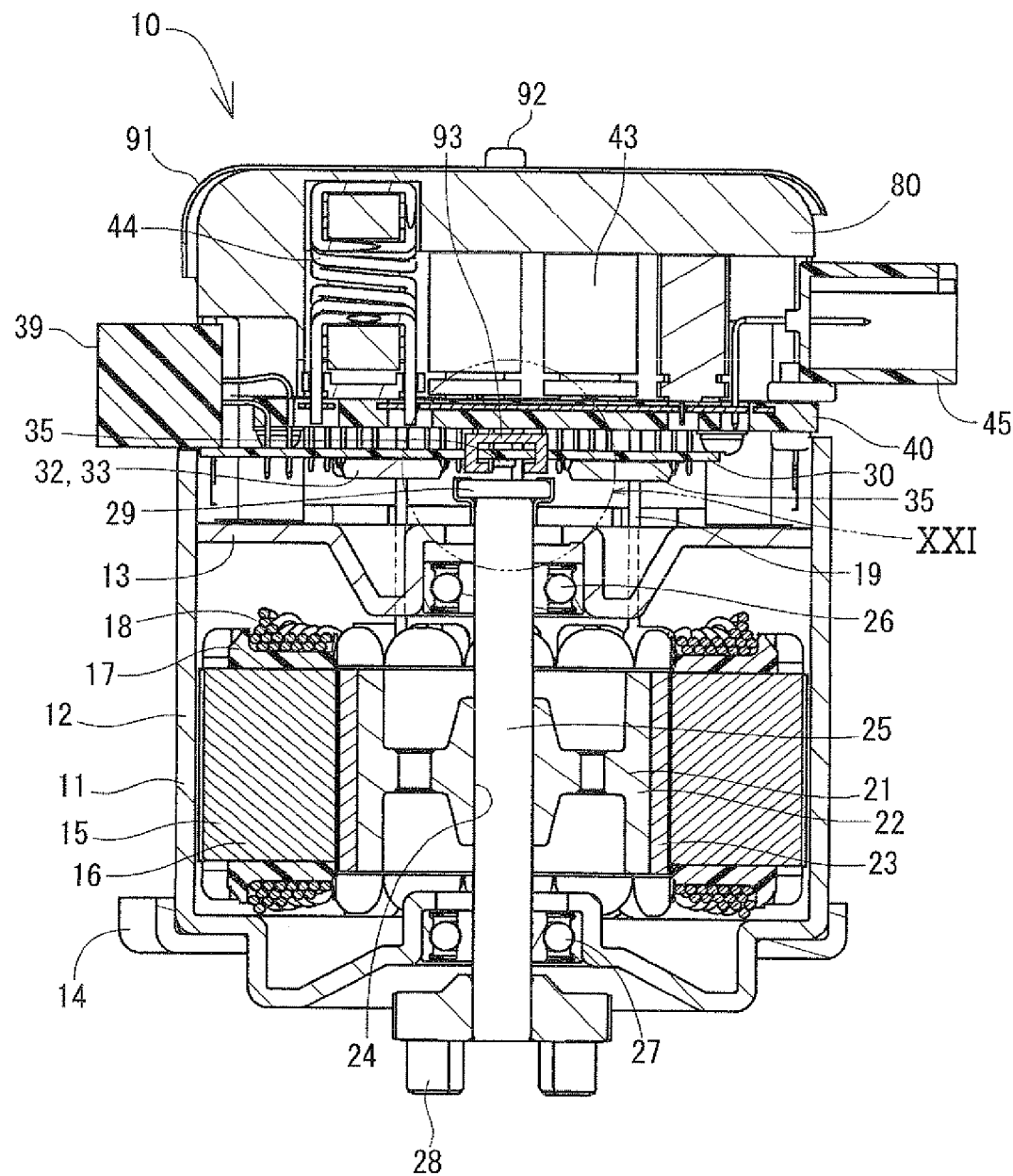
FIG. 20 is a cross-sectional view showing a motorized equipment according to a second embodiment of the present invention.
Figure 21:
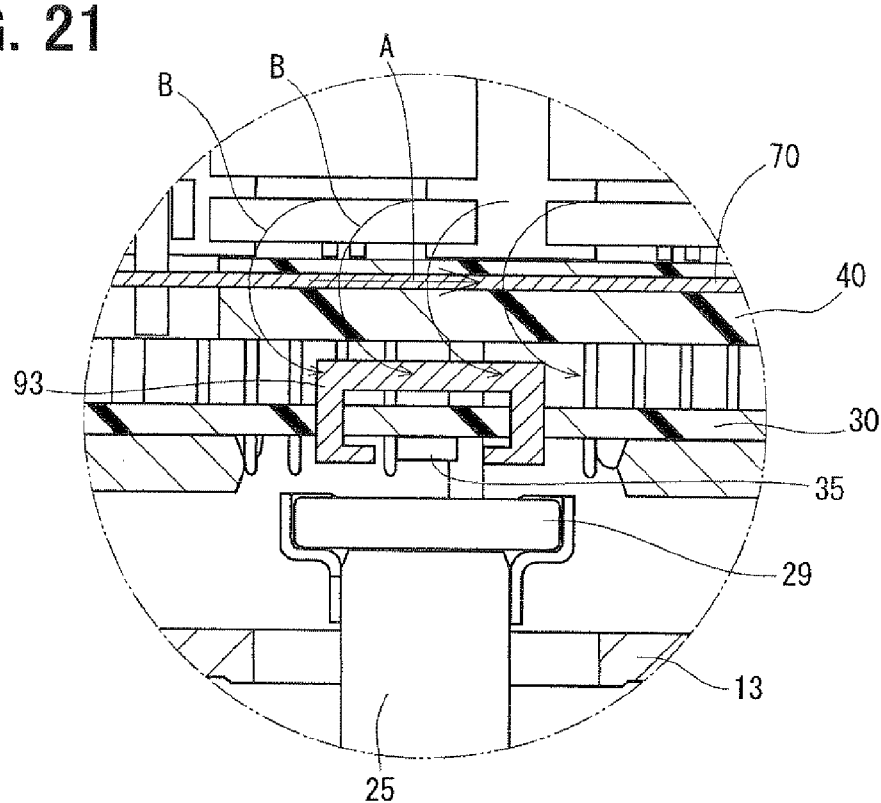
FIG. 21 is an enlarged partial cross-sectional view showing a substantial part of the motorized equipment of FIG. 20 indicated by a circle XXI.

Next, a second embodiment of the present invention will be described. A motorized equipment 10 according to the present embodiment is shown in FIGS. 20 and 21. The motorized equipment 10 according to the present embodiment has a shield member 93 between the position sensor 35 and the power module 40. The shield member 93 is made of a material such as iron having high magnetic permeability.

A large current supplied from the battery 5 flows through the wirings 70-75 of the power module 40 as shown by an arrow mark A in FIG. 21. Therefore, an electromagnetic field is generated as shown by arrow marks B. If the electromagnetic field acts on the position sensor 35, there is a possibility that an error arises in the signal outputted from the position sensor 35.

Regarding this point, in the present embodiment, the electromagnetic field generated by the large current flowing through the wirings 70-75 of the power module 40 flows along the shield member 93. Therefore, the position sensor 35 is shielded from the electromagnetic field. Therefore, a distance between the power module 40 and the control board 30 can be shortened. Accordingly, the axial body size of the motorized equipment 10 can be reduced.

(Third Embodiment)

Figure 22:
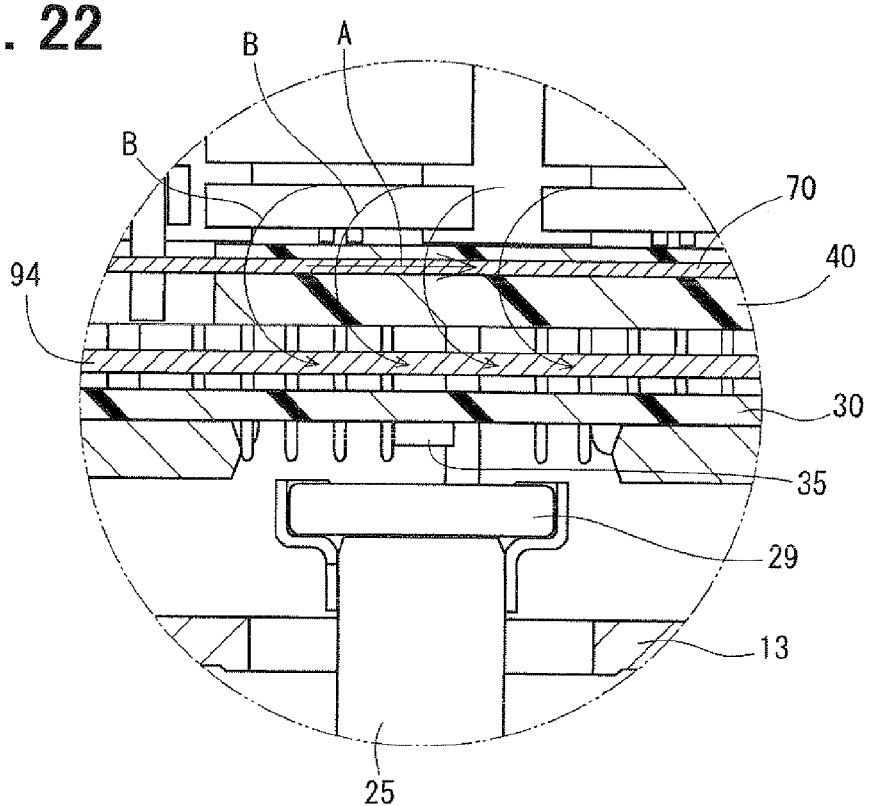
FIG. 22 is an enlarged partial cross-sectional view showing a substantial part of a motorized equipment according to a third embodiment of the present invention.

Next, a third embodiment of the present invention will be described. FIG. 22 shows a motorized equipment according to the present embodiment. In the present embodiment, a shield member 94 is formed in the shape of a flat plate. Thus, the control board 30 can be shielded over a wide area and a processing cost of the shield member 94 can be reduced.

(Fourth Embodiment)

Figure 23:
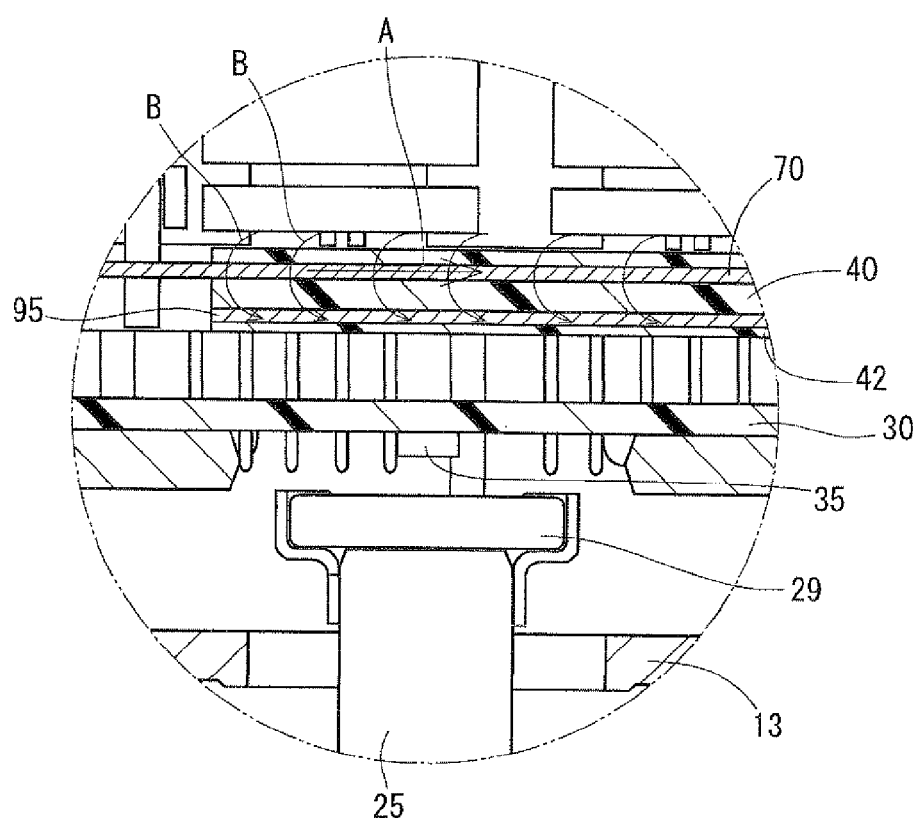
FIG. 23 is an enlarged partial cross-sectional view showing a substantial part of a motorized equipment according to a fourth embodiment of the present invention.

Next, a fourth embodiment of the present invention will be described. FIG. 23 shows a motorized equipment according to the present embodiment. In the present embodiment, a shield member 95 is inserted in and integrated with the power module 40 by the resin molding together with the power transistors 51-58, the wirings 70-75 and the like, thereby forming the power module 40. The shield member 95 is inserted on the control board 30 side of the power transistors 51-58 and the wirings 70-75 by the resin molding. Thus, as compared to the second or third embodiment, a distance between the shield member 95 and the position sensor 35 can be lengthened. Accordingly, the distance between the control board 30 and the power module 40 can be shortened.

(Fifth Embodiment)

Figure 24:
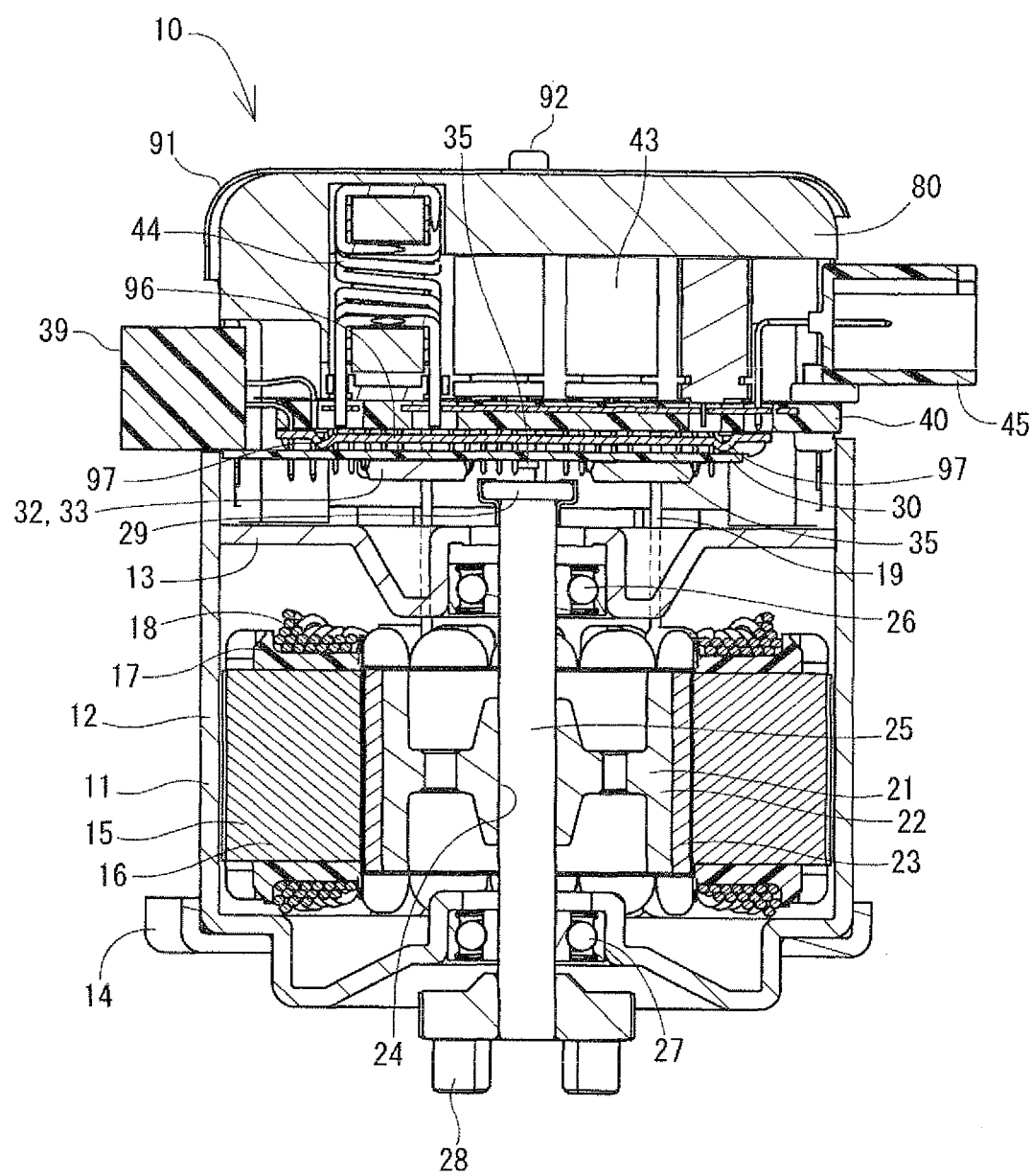
FIG. 24 is a cross-sectional view showing a motorized equipment according to a fifth embodiment of the present invention.

Next, a fifth embodiment of the present invention will be described. FIG. 24 shows a motorized equipment 10 according to the present embodiment. The present embodiment is a modification of the third embodiment. In the present embodiment, a curved surface section 97 is formed in an edge of a shield member 96. One side of the curved surface section 97 with respect to the board thickness direction contacts the control board 30, and the other side of the curved surface section 97 contacts the power module 40. Therefore, the power module 40 and the heat sink 80 can be fixed by an elastic force of the curved surface section 97 without using the screws 41. Accordingly, man-hours for assembling the controller can be reduced, and the manufacturing cost of the motorized equipment 10 can be reduced.

(Modifications)

In the above-described embodiments, the two sets of the inverter circuits are formed by the twelve power transistors in the motorized equipment, which drives and controls the electric motor by the drive control of the two systems. Alternatively, the motorized equipment according to the present invention may drive and control the electric motor by drive control of a single system or three or more systems.

In the above-described embodiments, the brushless motor used for the electric power steering is used as the example. Alternatively, the motorized equipment according to the present invention may be used for various uses other than the electric power steering. The present invention may be applied to a motor with brush, in which a coil is wound around a rotor.

In the above-described embodiments, the multiple power transistors, the wirings and the like are arranged on the same plane and covered with the resin by the resin molding, thereby forming the power module. The power module is arranged in the bottom of the heat sink horizontally. Alternatively, the present invention may be applied to a construction, in which the power transistors, the wirings and the like are individually covered with the resin by the resin molding and are arranged vertically on a side surface of the heat sink.

In the above-described embodiments, the single control board is used. Alternatively, two or more control boards may be used.

In the above-described embodiments, the entirety of the heat sink is covered with the cover. Alternatively, the present invention may be applied to a construction, in which only the openings formed outside the flat surface sections of the heat sink are covered with the cover.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A motorized equipment comprising:
   a motor case;
   a stator fixed inside the motor case;
   a rotor provided to be rotatable relative to the stator;
   a shaft that is fixed to the rotor and that is rotatably supported by the motor case;
   a plurality of power transistors that are provided on one axial side of the shaft outside the motor case such that the power transistors are electrically connected with extraction lines extending from a coil wound around the stator or the rotor, the power transistors supplying a drive current to the coil;
   a control board that is provided on a rotor side of the power transistors outside the motor case for controlling switching of the power transistors; and
   a heat sink that is provided on the other side of the control board opposite to the rotor side outside the motor case for absorbing a heat generated by the power transistors.

2. The motorized equipment as in claim 1, further comprising:
   a magnet provided on one axial end portion of the shaft; and
   a position sensor provided to the control board for outputting a signal corresponding to a direction of a magnetic field generated by the magnet.

3. The motorized equipment as in claim 1, wherein
   the power transistors and the control board are fixed to the heat sink, and
   the heat sink and the motor case are connected with each other.

4. The motorized equipment as in claim 1, wherein
   the power transistors are inserted in a resin mold, which is molded in the shape of a plate, together with wirings connecting the power transistors by resin molding, thereby forming a power module, and
   the control board, the power module and the heat sink are arranged in this order from the motor case side along the axial direction of the shaft.

5. The motorized equipment as in claim 4, further comprising:
   electronic components provided on a side of the power module opposite to the control board with respect to a board thickness direction of the power module, the electronic components being electrically connected with the wirings connecting the power transistors, wherein
   the heat sink has a recess for accommodating the electronic components.

6. The motorized equipment as in claim 5, further comprising:
   a shield member provided between the power module and the position sensor.

7. The motorized equipment as in claim 6, wherein
   the shield member is inserted in the resin mold together with the power transistors and the wirings connecting the power transistors by the resin molding, thereby forming the power module.

8. The motorized equipment as in claim 1, wherein
   the extraction lines extending from the coil extend through holes, which are formed in the control board in a board thickness direction of the control board, and are electrically connected with terminals of the power transistors.

9. The motorized equipment as in claim 1, further comprising:
   a cover provided on a side of the heat sink opposite to the motor case, the cover having a function to shield a radiation noise.

* * * * *